United States Patent
Gupta et al.

(10) Patent No.: US 10,657,110 B2
(45) Date of Patent: May 19, 2020

(54) SYSTEMS AND METHODS FOR DISAGGREGATING APPLIANCE LOADS

(71) Applicant: Bidgely Inc., Moutain View, CA (US)

(72) Inventors: Abhay Gupta, Cupertino, CA (US); Vivek Garud, Cupertino, CA (US)

(73) Assignee: Bidgely Inc., Mountain View, CA (US)

( * ) Notice: Subject to any disclaimer, the term of this patent is extended or adjusted under 35 U.S.C. 154(b) by 160 days.

(21) Appl. No.: 15/675,716

(22) Filed: Aug. 12, 2017

(65) Prior Publication Data

US 2018/0210900 A1 Jul. 26, 2018

Related U.S. Application Data

(60) Provisional application No. 62/449,230, filed on Jan. 23, 2017.

(51) Int. Cl.
| | |
|---|---|
| *G06G 7/48* | (2006.01) |
| *G06F 16/21* | (2019.01) |
| *G06Q 50/06* | (2012.01) |
| *G06Q 30/04* | (2012.01) |
| *G06F 16/215* | (2019.01) |

(52) U.S. Cl.
CPC .......... *G06F 16/211* (2019.01); *G06F 16/215* (2019.01); *G06Q 30/04* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 7,561,977 | B2* | 7/2009 | Horst | H02J 3/14 700/295 |
| 8,024,073 | B2 | 9/2011 | Imes et al. | |
| 2008/0306985 | A1* | 12/2008 | Murray | G06Q 10/10 |
| 2011/0251807 | A1* | 10/2011 | Rada | G01D 4/00 702/61 |
| 2012/0053740 | A1 | 3/2012 | Venkatakrishnan et al. | |
| 2012/0290230 | A1* | 11/2012 | Berges Gonzalez | G01D 4/004 702/61 |
| 2013/0066479 | A1 | 3/2013 | Shetty et al. | |

(Continued)

*Primary Examiner* — Rehana Perveen
*Assistant Examiner* — Nithya J. Moll
(74) *Attorney, Agent, or Firm* — Landmark Intellectual Property Law, PLLC (57) ABSTRACT

The present invention is generally directed to systems and methods for performing energy disaggregation of appliances in a home. In accordance with some embodiments of the invention, a method may include receiving one or more parameters corresponding to plurality of the appliances installed in home through an energy disaggregation device. The one or more parameters may be associated with the home. The method may further include receiving localized energy consumption data of a region where the home environment is located, selecting a predefined energy disaggregation model from one or more predefined energy disaggregation models based on the localized energy consumption data, adjusting the predefined energy disaggregation model based on the one or more parameters, and/or applying the adjusted predefined energy disaggregation model to the energy consumption data to perform disaggregation of the energy consumption into a plurality of appliance categories.

18 Claims, 5 Drawing Sheets

(56) References Cited

U.S. PATENT DOCUMENTS

| | | | |
|---|---|---|---|
| 2014/0074300 A1* | 3/2014 | Shilts | G05D 23/01 |
| | | | 700/276 |
| 2015/0142695 A1 | 5/2015 | He et al. | |
| 2016/0005015 A1 | 1/2016 | Curtis | |
| 2016/0212506 A1* | 7/2016 | Norwood | H04Q 9/00 |
| 2016/0238640 A1 | 8/2016 | Maasoumy et al. | |
| 2017/0176967 A1 | 6/2017 | Takada et al. | |

* cited by examiner

Home A

Home A is a newer 2-bedroom, all-electric flat, with 2 adult occupants

| | |
|---|---|
| Property Type: | Flat |
| Size: | 2 Bedroom |
| Built: | Post-2000 |
| Occupants: | 2 Adults |
| Gas Appliances: | None |
| Main Electric Appliances: | Heating, Water Heating, Refrigerator, Oven, HOB, Kettle, Dishwasher, Washing Machine, Dryer |

Home B

Home B is an older 4-bedroom, gas and electric semi-detached home with 2 retired occupants

| | |
|---|---|
| Property Type: | Semi-Detached |
| Size: | 4 Bedroom |
| Built: | 1925-1976 |
| Occupants: | 2 Retired Adults |
| Gas Appliances: | Heating, Water Heating, HOB |
| Main Electric Appliances: | Refrigerator, Oven, Kettle, Dishwasher, Washing Machine, Dryer |

000
SYSTEMS AND METHODS FOR DISAGGREGATING APPLIANCE LOADS

RELATED APPLICATIONS

This application claims priority to U.S. Provisional Application No. 62/449,230, filed on 23 Jan. 2017, which is incorporated by reference herein in its entirety.

TECHNICAL FIELD

This disclosure relates generally to disaggregation of energy consumption and more particularly to systems and methods for performing disaggregation of energy consumption into appliance categories.

BACKGROUND

It is well-established knowledge that customer engagement, regardless of industry, is a vital element that separates great companies from the rest. In the residential energy sector, one proven way to engage consumers is through energy disaggregation. In energy disaggregation, consumer's total energy consumption is analysed and attributed to different appliances in home so that consumer can take an informed decision about energy consumption.

There are instances where data limitations may cause consumers to have or receive disaggregation for only a portion of their consumption. Unfortunately, in such scenarios, the opportunity to educate the consumers on appliances that are not disaggregated may be lost.

In some cases, energy disaggregation of appliances may provide a partial itemization, often with limited coverage in terms of percentage of total energy consumption disaggregated. Moreover, many disaggregation techniques are limited to smart meter data only. For example, legacy non-smart meters with one reading per billing cycle may have limited data resolution to extract much meaningful appliance patterns using existing disaggregation techniques.

Some existing statistical models may attempt to use low-resolution data to output an itemization bases such determinations on regional research, such as surveys or questionnaire, and are not generally accurate. Some such models are known to take user feedback (e.g., "I don't have AC") and readjust the itemization. This approach is agnostic to the user's actual consumption, and all users who have given the same feedback will have the same percentage breakdown. In other words, this approach does not provide a true item level disaggregation based on low-resolution data.

Some existing systems that attempt to utilize a high-resolution disaggregation models may attempt detect as many appliances as possible, and aggregate the rest into an "Other" category. This approach will suffer, as the "Other" category is often quite large as a percentage of whole house energy consumption.

Accordingly, disaggregation techniques and systems that may utilize both low-resolution data and high resolution data (such as, but not limited to data received from a smart meter) is desirable.

SUMMARY

In accordance with some embodiments of the present invention, a method for performing energy disaggregation of appliances in a home is disclosed. In one embodiment, the method comprises receiving one or more parameters corresponding to plurality of the appliances installed in the home through an energy disaggregation device. The one or more parameters are associated with characteristics of the specific home. The method further comprises receiving localized energy consumption data of a region where the home is located. The method further comprises selecting a predefined energy disaggregation model from one or more predefined energy disaggregation models based on the localized energy consumption data. The method further comprises adjusting the predefined energy disaggregation model based on the one or more parameters. The method further comprises applying the adjusted predefined energy disaggregation model to the energy consumption data to perform disaggregation of the energy consumption into a plurality of appliance categories.

In accordance with some embodiments of the present invention, a system for performing energy disaggregation of appliances in a home is disclosed. The system comprises one or more hardware processors and a memory communicatively coupled to the one or more hardware processors storing instructions, that when executed by the one or more hardware processors, cause the one or more hardware processors to perform operations comprising receiving one or more parameters corresponding to plurality of the appliances installed in the home through an energy disaggregation device. The one or more parameters are associated with the home. The operations further comprise receiving localized energy consumption data of a region where the home environment is located. The operations further comprise selecting a predefined energy disaggregation model from one or more predefined energy disaggregation models based on the localized energy consumption data. The operations further comprise adjusting the predefined energy disaggregation model based on the one or more parameters. The operations further comprise applying the adjusted predefined energy disaggregation model to the energy consumption data to perform disaggregation of the energy consumption into a plurality of appliance categories.

In accordance with some embodiments of the present invention, a computer readable medium for performing energy disaggregation of appliances in a home is disclosed. The computer readable medium stores instructions, that when executed by the one or more hardware processors, cause the one or more hardware processors to perform operations comprising receiving one or more parameters corresponding to plurality of the appliances installed in the home through an energy disaggregation device. The one or more parameters are associated with the home. The operations further comprise receiving localized energy consumption data of a region where the home environment is located. The operations further comprise selecting a predefined energy disaggregation model from one or more predefined energy disaggregation models based on the localized energy consumption data. The operations further comprise adjusting the predefined energy disaggregation model based on the one or more parameters. The operations further comprise applying the adjusted predefined energy disaggregation model to the energy consumption data to perform disaggregation of the energy consumption into a plurality of appliance categories.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of systems and/or methods in accordance with embodiments of the present subject matter are now described, by way of example only, and with reference to the accompanying figures.

DETAILED DESCRIPTION

In the present document, the word "exemplary" is used to mean "serving as an example, instance, or illustration." Any embodiment or implementation of the present subject matter described herein is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Systems and methods for performing energy disaggregation of appliances in a home, in accordance with some embodiments of the present invention, is described in detail in conjunction with FIGS. 1-5. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its scope. While aspects of the platform and method can be implemented in any number of different environments, and/or configurations, the embodiments are described in the context of the following exemplary system architecture(s).

Figure 1:
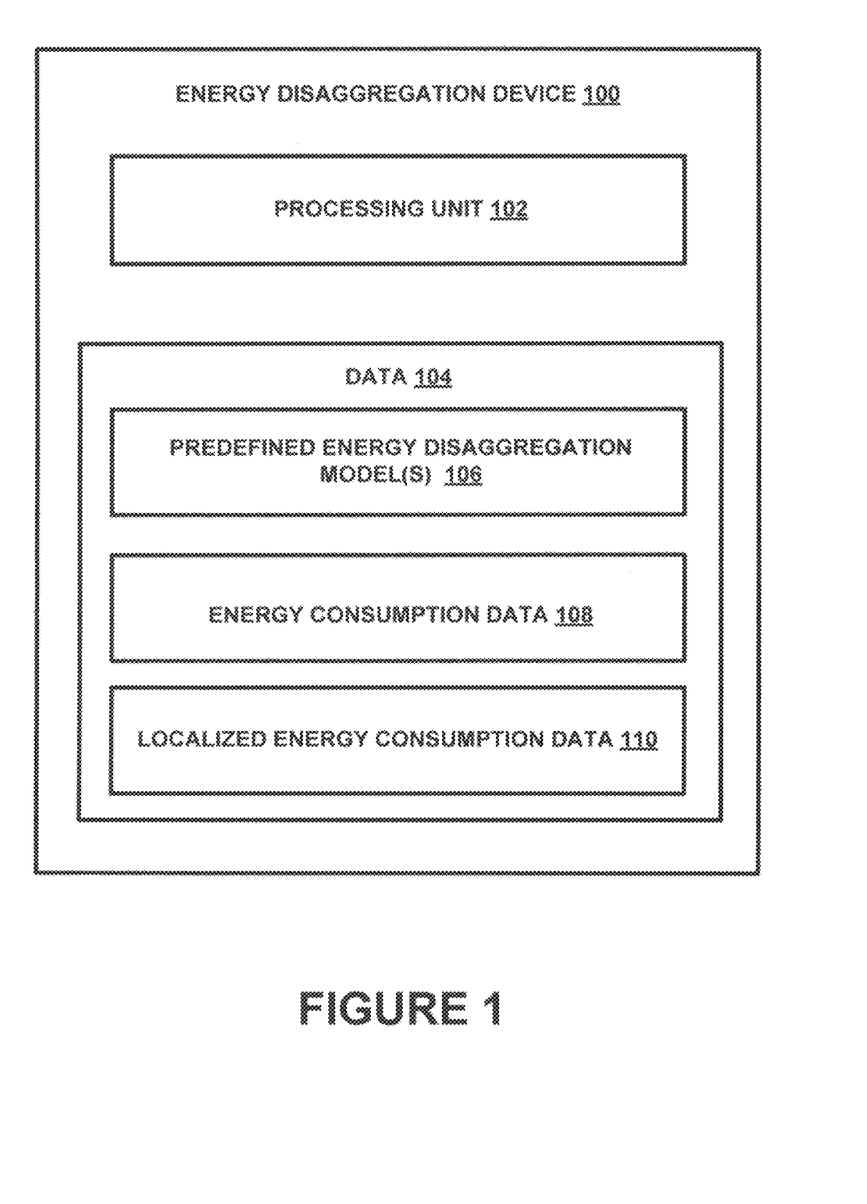
FIG. 1 illustrates an exemplary energy disaggregation device for performing energy disaggregation of appliances in a home environment, in accordance with some embodiments of the present disclosure.

FIG. 1 illustrates an exemplary energy disaggregation device 100 for performing energy disaggregation of appliances in a home, in accordance with some embodiments of the present disclosure. For brevity, hereinafter the energy disaggregation device 100 may be referred to as device 100.

As shown in FIG. 1, the device 100 may comprise a processing unit 102 and data 104. In an example, the data 104 may be present external to the device 100. The processing unit 102 may receive the data 104 and process the data in order to perform energy disaggregation. The data 104 may comprise one or more predefined energy disaggregation models 106, energy consumption data 108, and localized energy consumption data 110.

In operations, to perform energy disaggregation for the appliances present in a home into a plurality of appliance categories, the processing unit 102 may detect energy consumption data of the appliances. In an example, to detect the energy consumption data, the processing unit 102 may receive energy consumption readings from meters located in the home. The processing unit 102 may then analyse the energy consumption readings and obtain the energy consumption data comprising the one or more parameters. The processing unit 102 may store the one or more parameters in the energy consumption data 104 for further processing.

Examples of the one or more parameters may include patterns indicating energy consumption, base load activities, user attributes, home attributes, appliance attributes, weather attributes, energy disaggregation output from other algorithms, and historical energy disaggregation results. The one or more parameters may be then used to obtain established set of rules, weights, and conditions.

In an example, the processing unit 102 may receive the energy consumption data sampled at a predefined interval of time. In an example, the processing unit 102 may detect energy consumption patterns of the appliances using high-resolution, such as receiving data sampled at intervals of 10 second, 15 minute, 60 minute, or daily based on availability.

In another example, the processing unit 102 may execute energy disaggregation on the energy consumption data to retrieve partially disaggregated energy data. Thereafter, the processing unit 102 may use the partially disaggregated energy data to perform further itemization of the appliances. It may be noted that, the processing unit 102 may perform the itemization of the appliances without the partially disaggregated energy data.

Once the one or more parameters are obtained, the processing unit 102 may receive localized energy consumption data of a region where the home environment is located. In an example, the localized energy consumption data may comprise data indicating type, size, and age of buildings, type of devices being used in the region, and weather condition of the region.

Thereafter, the processing unit 102 may select a predefined energy disaggregation model from the one or more predefined energy disaggregation models based on the localized energy consumption data. The processing unit 102 takes advantage of any home-level, user-level and regional information to derive the best possible statistical model, the predefined energy disaggregation model, with rules that may specify both lower and upper bounds in terms of both relative and absolute consumptions for a plurality of appliance categories.

In an example, the one or more predefined energy disaggregation models may comprise one or more constraints, rules, and weights that define how energy should be distributed across different output categories of the appliances. The predefined energy disaggregation models may be stored in the predefined energy disaggregation models 106. The processing unit 102 may create the one or more predefined energy disaggregation models 106 based on home attributes, appliance attributes, and region attributes. Further, the processing unit 102 may select one or more predefined energy disaggregation models from the predefined energy disaggregation models 106 based on the localized energy consumption data.

In order to verify the one or more predefined disaggregated models, the processing unit 102 may use user feedback on disaggregation of the appliances and energy consumption of the appliances. In an example, the processing unit may check percentage of users where "Always On" consumption is, for example, 0% or above 40%. If data received is outside of this range, the processing unit 102 may signal an issue with the model selected, and note that a detailed review of the model selection may be desired. For example, the implementer testing the model selected on a given set of users may signal such an issue. In another example, the processing unit 102 may check disaggregation for appliances that are estimated to consume less than 1% of the total energy summed up over all users and may signal an issue in the model. In another example, the processing unit 102 may check accuracy of the results by looking into month to month stability of the numbers. If per-category values are changing drastically from month to month, that could signal an error in the model.

Further, the processing unit 102 may adjust the predefined energy disaggregation model based on the one or more parameters. In an example, the processing unit 102 may adjust the predefined energy disaggregation models based on rules that reflect user and home properties, base load activities, intraday time-specific usage (e.g. morning and evening lighting usage, meal-time cooking usage), intraweek time-specific usage (e.g. high entertainment usage on weekends), and seasonal usage (along with weather data) obtained from the one or more parameters.

Once the predefined energy disaggregation model is obtained and adjusted, the processing unit 102 may apply the adjusted predefined energy disaggregation model to the energy consumption data to perform disaggregation of the energy consumption into a plurality of appliance categories. In an example, the plurality of appliance categories may include "always on". "space heating", "refrigeration", "entertainment", "water heating", "cooking", "laundry", "electric vehicle", "pool and sauna", and/or "lighting". The disaggregation of the energy consumption into the plurality of appliance categories is discussed in conjunction with FIGS. 4(a) and 4(b).

In another example, the processing unit may further analyse the plurality of appliance categories and obtain an optimal disaggregated energy profile for each of the appliances.

In an optional embodiment, the present method and system can also be utilized to disaggregate energy usage into various categories apart from the appliances. For instance, the present method and system may itemize the energy usage into time periods, fuel type and/or any combination thereof.

Further, the processing unit 102 may execute the adjusted model for at least one specific period of aggregate energy consumption to perform disaggregation of energy consumption for each of the appliances.

The device 100 may operate based on an optimization model, which attempts to return estimates close to a combination of the statistical average and the high-resolution disaggregation estimates, while obeying a set of absolute constraints (due to physical limitations, such as AC cannot consume too little energy, or refrigeration cannot consume too much energy) and relative constraints (due to behavioural constraints such as water heater consuming more than refrigeration).

One implementation of the device 100 is provided below. Global Inputs used by the device 100 may include: (i) $A_i$=Average usage (kWh) of appliance category I; (ii) $kWh^-_i$, $kWh^+_i$=Lower and upper bounds in usage (kWh) of appliance category I; (iii) $\%^-_i$, $\%^+_i$=Lower and upper bounds in percentage usage (%) of appliance category I; and (iv) $O\%^-_i$, $O\%^+_i$=Lower and upper bounds in percentage usage (%) of others.

Per-User Inputs may include: (i) $\sigma_{i,user}$=Variability of appliance category I; and (ii) $kWh_{user}$=Total usage (kWh) of the user, within the month. Variables to be estimated may include: (i) $C_{i,user}$=Consumption (kWh) of appliance category I; and (ii) $O_{user}$=Consumption (kWh) of others.

Objective Function:

$$\min \sum_{i=1}^{n} \frac{|C_i - A_i|}{\sigma_i}$$

Consumptions is preferred to be around the averages and a high variability allows the consumptions to be farther away from the averages, while incurring the same cost.

Constraints:

$$kWh^-i \le C_{i,user} \le kWh^+i \quad \text{(Absolute Limits)}$$

$$\%^-i \le \frac{C_{i,user}}{kWh_{user}} \le \%^+i \quad \text{(Percentage Limits)}$$

$$O\%^- \le \frac{O_{user}}{kWh_{user}} \le O\%^+ \quad \text{(Others Limit)}$$

$$\sum_{i=1}^{n} C_{i,user} + O_{user} = kWh_{user} \quad \text{(Full pie constraint)}$$

It may be noted that the $A_i$ (Average usage (kWh) of appliance category i) is a number that is a function of disaggregation output for the specific category from high or low frequency disaggregation algorithms, average energy usage in that category across the population for that local geography, and optional home and appliance profile attributes for the specific user or home. Further, additional rules (season, time of day) may be used to further adjust the averages and upper/lower limits.

In an example, creation of the rule-based model is an offline information-gathering exercise that needs to be performed by the processing unit 102 before the solution is deployed. The information needed for creating the model may be gathered from recent reports on residential energy consumption in the local geography, typically covering the following information/categories shown in Table 1 below.

| Electricity | Gas | Consumption Variables |
| --- | --- | --- |
| Refrigeration | Space Heating | Property Type |
| Heating | Water Heating | Property Size |
| Cooling | Cooking | Property Age |
| Water Heating | | Own vs Rent |
| Cooking | | # Occupants |
| Lighting | | Occupant Life Stage |
| Entertainment | | Space Heating Type |
| Laundry | | Water Heating Type |
| Other | | Month of Year |
| | | Weather |

The rule-based model, predefined energy disaggregation model, may be created for all regions. The processing unit 102 may create predefined energy disaggregation model by searching for published studies and statistical research on residential energy usage in the specific geography. Further, the processing unit 102 may consider information, such appliance ownership among different demographic segments of population, distribution of home attributes over different demographic segments (e.g. number of occupants, home size, home, and age), relationship of home and appliance attributes to energy consumption of appliance categories (e.g. If number of occupants in a home doubles from 2 to 4, how much does the energy consumption of laundry appliances increase?). Further, the processing unit 102 may encode relevant information into a geography specific rule-based model.

Figure 2:
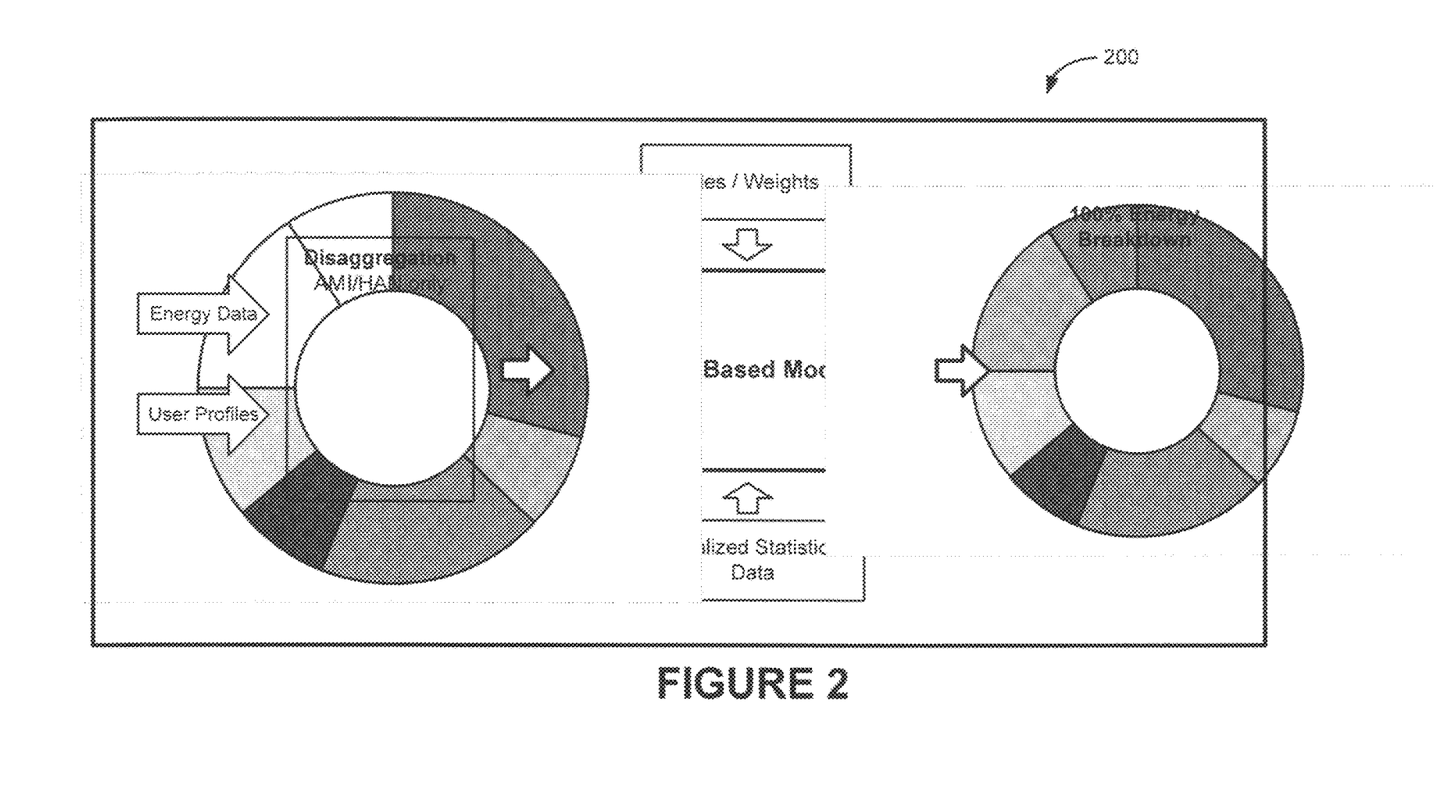
FIG. 2 illustrates an exemplary hybrid model for performing energy disaggregation, in accordance with some embodiments of the present disclosure.

FIG. 2 illustrates an exemplary hybrid model 200 for performing energy disaggregation, in accordance with some embodiments of the present disclosure.

As shown in FIG. 2, to perform energy disaggregation geography-specific public appliance usage data may be imported into the model 200. Further, home energy usage for the month may be imported into the model 200. Also, all available attributes for the user/home may be used as input for the model 200. Once all the inputs are imported into the model 200, disaggregation algorithms may be executed. This may typically disaggregate 50-70% of the energy usage depending on the home. Thereafter, the partially disaggregated energy data may be passed from rule-based model to obtain the 100% hybrid breakdown of the energy. Rules/weights obtained from the localized energy consumption data are used as input to the rule based model.

Figure 3:
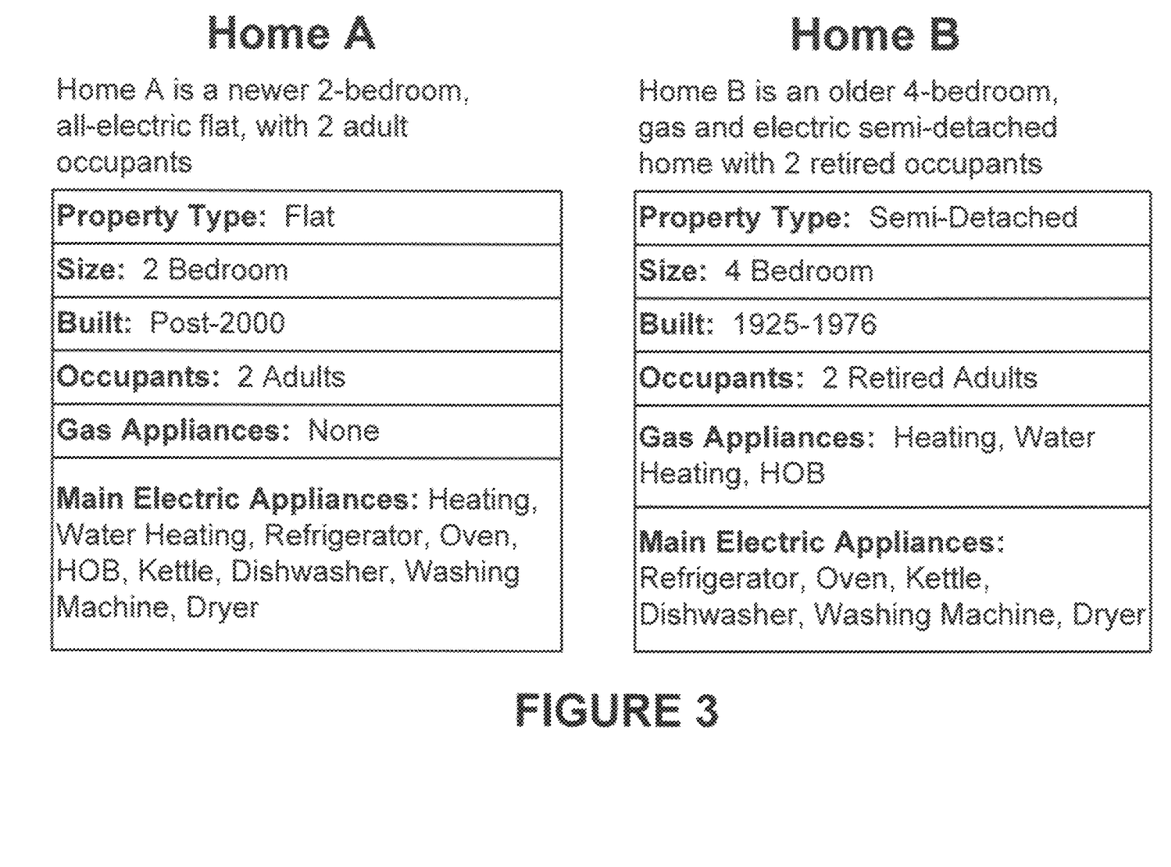
FIG. 3 illustrates an exemplary chart depicting various attributes of two homes, in accordance with some embodiments of the present disclosure.

FIG. 3 illustrates an exemplary chart depicting various attributes of two homes, in accordance with some embodiments of the present disclosure. As shown in FIG. 3, various attributes of two homes, home A and home B, are considered for comparing the energy disaggregation. The attributes considered are property type, size, built, occupants, gas appliances, and main electric appliances.

Figure 4A:
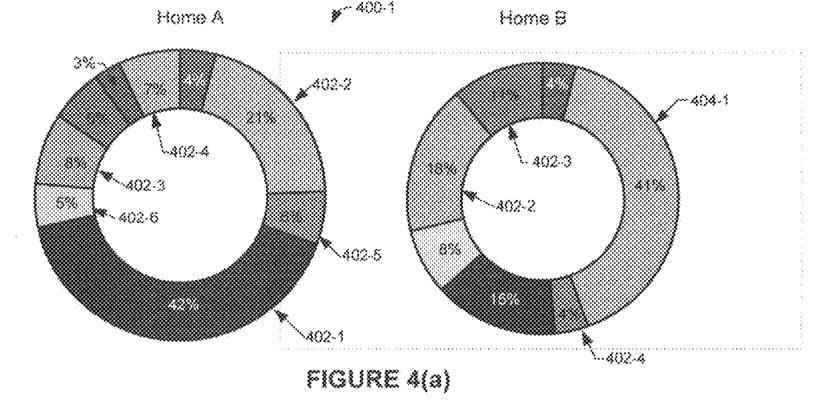
FIGS. 4(a) and 4(b) illustrate an exemplary energy disaggregation of appliances in two different seasons, in accordance with some embodiments of the present disclosure.
Figure 4B:
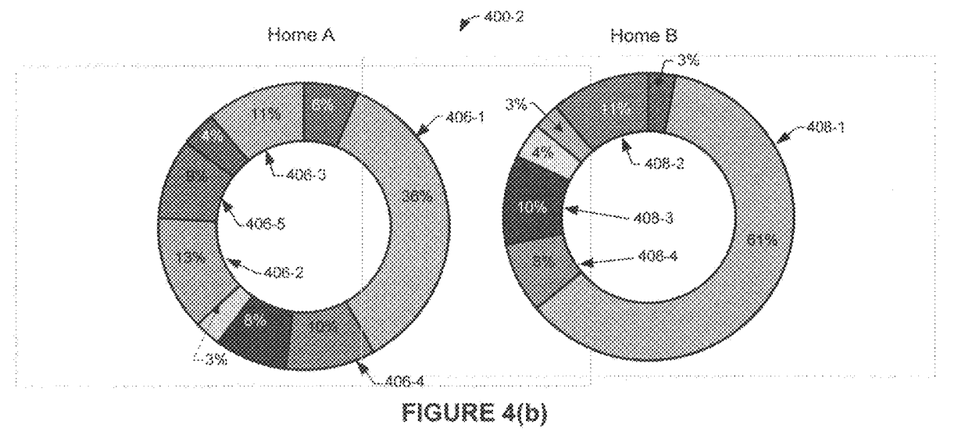

FIGS. 4(a) and 4(b) illustrate an exemplary energy disaggregation of appliances in two different seasons, in accordance with some embodiments of the present disclosure.

For the sake of brevity, only some of the categories in energy disaggregation are considered herein. In FIG. 4(a), numerals 402-1, 402-2, 402-3, 402-4, 402-5 and 402-6 represent "electric heating", "always on", "cooking". "entertainment", "refrigeration", and "water heating" respectively of Home A. Numerals 404-1, 404-2, 404-3, and 404-4 represent "always on", "lighting", "cooking", and "entertainment" respectively in Home B.

In comparison, for a period of time between June to January, the first notable difference in energy usage for the two homes (Home A and Home B) is the increase in overall energy usage in winter. For Home A, much of that higher usage is due to the increase in electric heating 402-1. For Home B, there is a significant increase in Lighting 404-2, as well as a notable increase in Cooking 404-3. As the winter months are darker and colder in the United Kingdom, it makes sense that the retiree occupants would be using more lighting and electric cooking.

In FIG. 4(b), numerals 406-1, 406-2, 406-3, 406-4, and 406-5 represent "always on", "cooking", "entertainment", "refrigeration", and "laundry" respectively in Home A. Numerals 408-1, 408-2, 404-8, and 404-8 represent "always on", "entertainment", "cooking" and "refrigeration" respectively in Home B.

In comparison for June energy usage for the two homes, a few differences become apparent. Although Home B is larger, Home A is an all-electric flat. As such. Home A has more appliances making up the pie, as well as a much higher energy use. Because Home B has some significant gas appliances, it has a higher percentage of electricity usage coming from "Always On" 408-1 (61% vs 35%). But in terms of total "Always On" consumption, Home A (173 kWh) and Home B (171 kWh) are quite similar. This may be justified by the fact that the additional electric appliances in Home A—Heater, Water Heater, HOB—do not contribute much (if anything) to "Always On" usage.

Thus, the present subject matter discloses a hybrid disaggregation approach that combines its industry-leading disaggregation algorithms with a localized rule-based model. The combination of these two elements provides a near complete itemization of energy consumption, creating a more engaging experience for the end users throughout the globe. Further, the present subject matter takes into account available home-specific information (pertaining to the user demographic, home profile, consumption patterns, weather trends, etc.), uses region-specific consumption patterns and trends from recent surveys or studies, merges channels of information, adjusts the global statistics using a set of global and region-specific rules based on correlation between appliance energy consumption and various user and home attributes (such as number of occupants, home size), and may return a complete or near complete breakdown of the consumer's energy consumption The proposed hybrid disaggregation model may utilize one or more different means to produce a complete or near complete energy disaggregation. It may detect as much appliance usage as possible from the high-resolution data, if available. It may then adapt the appliance-level consumption to the statistical models, thereby making the itemization compliant to a set of configurable rule-based statistical constraints. It comes up with an optimal combination of home-specific and statistical disaggregation.

The present subject matter may provide a number of benefits, including but not limited to data flexibility. In other words, systems and methods in accordance with some embodiments of the present invention may be used with various types of energy data. For example, such systems and methods may work with data received from a home area network (HAN) device that may have a high resolution (for example, with a sampling rate more frequent than one (1) minute), data received from advanced metering infrastructure (AMI), which may sample at fifteen (15) minute, thirty (30) minute, or sixty (60) minute intervals; data sampled only monthly (such as from a utility), and/or gas consumption data. The present subject matter requires minimal development required to localize for a given state, region, or country. Further, the present subject matter provides a self-improving mechanism. That is, as an end user or consumer engages and provides information such as home and appliance information, the accuracy of the results continues to improve.

Figure 5:
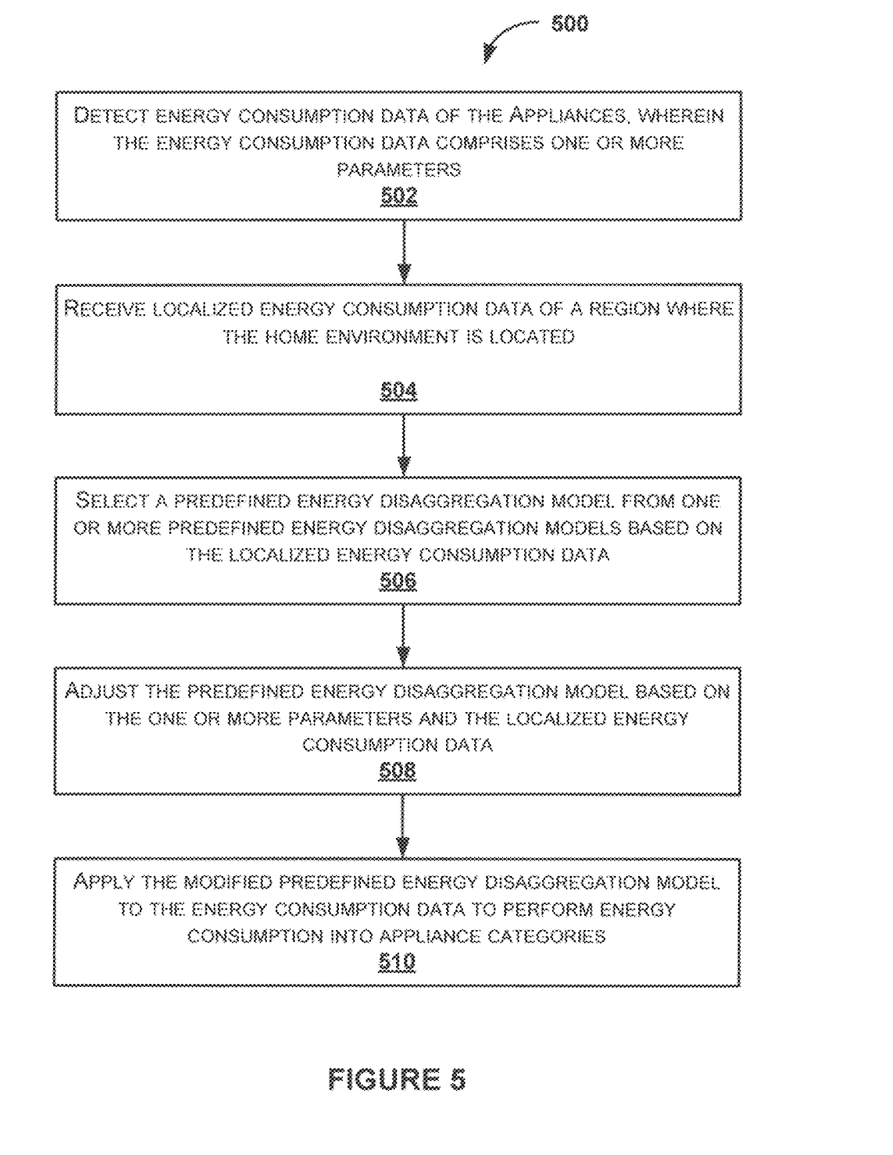
FIG. 5 illustrates an exemplary method for performing energy disaggregation of appliances in a home environment, in accordance with some embodiments of the present disclosure.

FIG. 5 illustrates an exemplary method 500 for performing energy disaggregation of appliances in a home environment, in accordance with some embodiments of the present disclosure.

The method 500 may be described in the general context of computer executable instructions, in a distributed computing environment, and/or through explicit physical actions performed by individual components. For example, the method 500 may be practiced in a distributed computing environment where functions are performed by remote processing devices that are linked through a communication network. In a distributed computing environment, computer executable instructions may be located in both local and remote computer storage media, including memory storage devices.

The order in which the method 500 described is not intended to be construed as a limitation, and any number of the described method blocks can be combined in any order to implement the method 500 or alternative methods. Additionally, individual blocks may be deleted from the method 500 without departing from the scope of the subject matter described herein. Furthermore, the method 500 may be implemented in any suitable hardware, software, firmware, or combination thereof.

With reference to method 500 as depicted in FIG. 5, at block 502, energy consumption data of the appliances may be received and analyzed. In an example, the energy consumption data comprises one or more parameters. Examples of the one or more parameters may include patterns indicating energy consumption, base load activities, user attributes, home attributes, appliance attributes, weather attributes energy disaggregation output from other algorithms, and/or historical energy disaggregation results. In an example, the energy consumption data may be received after a predefined interval of time depending upon the availability.

For example, processing unit 102 may obtain partially disaggregated energy data and consider the partially disaggregated energy data while performing the energy disaggregation for various categories of appliances.

At block 504, localized energy consumption data of a region may be received. It may be noted that the region is the place where the home environment is located. In an example, the localized energy consumption data comprises data indicating type, size, and age of buildings, type of devices being used in the region, and weather condition of the region At block 506, a predefined energy disaggregation model may be selected from one or more predefined energy disaggregation models based on the localized energy consumption data. In an example, the processing unit 102 may select the predefined energy disaggregation model that is configured for a particular geography based on the localized energy consumption data. In an example, the one or more predefined energy disaggregation models may be created based on home attributes, appliance attributes, and region attributes obtained from localized energy consumption.

Further, the predefined disaggregation models may comprise one or more constraints, rules and weights that define how energy should be distributed across different output categories.

In an example, the processing unit 102 may verify the one or more predefined disaggregated models based on disaggregation of the appliances and energy consumption of the appliances. The processing unit 102 may use predefined rules and user feedback on disaggregation while verifying the one or more predefined disaggregated models.

At block 508, the predefined energy disaggregation model may be adjusted based on the one or more parameters associated with the input energy consumption data. In an example, to make the predefined energy disaggregation model best suited for the energy disaggregation in a particular region for a particular home, the processing unit 102 may apply some rules, weights, and constraints to the predefined energy disaggregation model. In this manner, an adjusted predefined energy disaggregation model is obtained.

At block 510, the adjusted predefined energy disaggregation model may be applied to the energy consumption data to obtain an optimal disaggregated energy profile for each of the appliances. The categories may be divided based on the type of usage, such as always on, refrigeration, cooking, heating, and entertainment. In an example, an optimal disaggregated energy profile indicating various categories depicting consumption of energy may be obtained by performing the disaggregation of energy consumption. Further, the optimal disaggregated energy profile may indicate appliance categories, time periods, fuel types or various combinations thereof.

For example, the processing unit that may perform disaggregation may execute the adjusted model for at least one specific period of aggregate energy consumption in order to give a 100% energy breakup to the consumers.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for performing energy disaggregation from home energy consumption data of plurality of appliances installed in a home, the home energy consumption data comprising partially disaggregated and non-disaggregated energy consumption data from a previously applied predefined energy disaggregation model, the method comprising the steps of:
   receiving the partially disaggregated and non-disaggregated energy consumption data;
   receiving localized energy consumption data of a region where the home is located through the energy disaggregation device;
   receiving one or more parameters corresponding to plurality of the appliances installed in the home through an energy disaggregation device, wherein the one or more parameters are associated with the home;
   adjusting the predefined energy disaggregation model based on the one or more parameters; and
   applying the adjusted predefined energy disaggregation model to the remaining non-disaggregated energy consumption data to perform disaggregation of the home energy consumption data into a plurality of appliance categories.

2. The method of claim 1, wherein the one or more parameters is selected from the list consisting of: plurality of patterns indicating energy consumption, plurality of base load activities, plurality of user attributes, plurality of home attributes, plurality of appliances attributes, plurality of weather attributes, energy disaggregation output from other algorithms, and historical energy disaggregation results.

3. The method of claim 1, wherein the localized energy consumption data comprises: data indicating type, size of the home, and age of the home, type of devices being used in the region, and weather condition of the region.

4. The method of claim 1, wherein the one or more predefined energy disaggregation models are created based on at least one of: home attributes, appliance attributes, region attributes, and/or combination thereof.

5. The method of claim 1, wherein the predefined disaggregation models comprise: one or more constraints, rules and weights that define how energy should be distributed across different output categories.

6. The method of claim 1, wherein executing the adjusted predefined energy disaggregation model comprises executing the adjusted model for at least one specific period of aggregate energy consumption.

7. The method of claim 1, wherein detecting the energy consumption data comprises receiving the energy consumption data sampled at a predefined interval of time.

8. The method of claim 1, wherein the plurality of appliance categories comprises at least one of: "always on"; "space heating"; "refrigeration"; "entertainment"; "water heating"; "cooking"; "laundry"; "electric vehicle"; "pool and sauna"; "lighting" and/or a combination thereof.

9. An energy disaggregation device for performing energy disaggregation of plurality of appliances installed in a home, the device comprising:
at least one hardware processor;
a memory coupled to the at least one hardware processor, storing instructions, that when executed by the at least one hardware processor, causes the at least one hardware processor to perform operations comprising:
receiving one or more parameters corresponding to plurality of the appliances installed in the home, wherein the one or more parameters are associated with the home;
receiving localized energy consumption data of a region where the home environment is located;
selecting a predefined energy disaggregation model from one or more predefined energy disaggregation models based on the localized energy consumption data, and applying the predefined energy disaggregation model to the home energy consumption data, resulting in partially disaggregated energy data and remaining non-disaggregated energy consumption data;
adjusting the predefined energy disaggregation model based on the one or more parameters; and
applying the adjusted predefined energy disaggregation model to the remaining non-disaggregated energy consumption data to perform disaggregation of the energy consumption into a plurality of appliance categories.

10. The device of claim 9, wherein the one or more parameters is selected from the list consisting of: plurality of patterns indicating energy consumption, plurality of base load activities, plurality of user attributes, plurality of home attributes, plurality of appliances attributes, plurality of weather attributes, energy disaggregation output from other algorithms, and historical energy disaggregation results.

11. The device of claim 9, wherein the localized energy consumption data comprises data indicating type, size of the home, and age of buildings, type of devices being used in the region, and weather condition of the region.

12. The device of claim 9, wherein the one or more predefined energy disaggregation models are created based on at least one of: home attributes, appliance attributes, region attributes, and/or combination thereof.

13. The device of claim 9, wherein executing the adjusted predefined energy disaggregation model comprises executing the adjusted model for at least one specific period of aggregate energy consumption.

14. The device of claim 9, wherein detecting the energy consumption data comprises receiving the energy consumption data sampled at a predefined interval of time.

15. A non-transitory computer storage medium storing instructions, that when executed by the at least one hardware processor, causes the at least one hardware processor to perform operations comprising:
receiving home energy consumption data;
receiving one or more parameters corresponding to plurality of the appliances installed in the home, wherein the one or more parameters are associated with the home;
receiving localized energy consumption data of a region where a home is located;
selecting a predefined energy disaggregation model from one or more predefined energy disaggregation models based on the localized energy consumption data, and applying the predefined energy disaggregation model to the home energy consumption data, resulting in partially disaggregated energy data and remaining non-disaggregated energy consumption data;
adjusting the predefined energy disaggregation model based on the one or more parameters; and
applying the adjusted predefined energy disaggregation model to the remaining non-disaggregated energy consumption data to perform disaggregation of the energy consumption into a plurality of appliance categories.

16. The medium of claim 15, wherein detecting the energy consumption data further comprises executing energy disaggregation on the energy consumption data to retrieve partially disaggregated energy data through the energy disaggregation device.

17. The medium of claim 15, wherein the one or more parameters is selected from the list consisting of: plurality of patterns indicating energy consumption, plurality of base load activities, plurality of user attributes, plurality of home attributes, plurality of appliances attributes, plurality of weather attributes, energy disaggregation output from other algorithms, energy disaggregation results of other similar homes, and historical energy disaggregation results.

18. The medium of claim 15, wherein executing the adjusted predefined energy disaggregation model comprises executing the adjusted model for at least one specific period of aggregate energy consumption.

* * * * *